US012601386B2

(12) United States Patent
Kondo et al.

(10) Patent No.: US 12,601,386 B2
(45) Date of Patent: Apr. 14, 2026

(54) VIBRATION DAMPING DEVICE

(71) Applicant: SUMITOMO RIKO COMPANY LIMITED, Komaki (JP)

(72) Inventors: Hiroki Kondo, Komaki (JP); Kenji Oki, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 514 days.

(21) Appl. No.: 17/990,940

(22) Filed: Nov. 21, 2022

(65) Prior Publication Data

US 2023/0272838 A1 Aug. 31, 2023

(30) Foreign Application Priority Data

Feb. 25, 2022 (JP) ................................. 2022-027811

(51) Int. Cl.
*F16F 15/08* (2006.01)
*F16F 15/00* (2006.01)

(52) U.S. Cl.
CPC ........ *F16F 15/08* (2013.01); *F16F 2224/025* (2013.01); *F16F 2230/0029* (2013.01); *F16F 2230/0041* (2013.01)

(58) Field of Classification Search
CPC .................. F16F 2230/0041; F16F 2230/0029
See application file for complete search history.

(56) References Cited

U.S. PATENT DOCUMENTS 9,593,732 B2 3/2017 Thierry et al.
9,931,923 B2 4/2018 Oki et al.
2017/0341500 A1* 11/2017 Oki ...................... F16F 13/103

FOREIGN PATENT DOCUMENTS

| CN | 109690126 | A | 4/2019 | |
| JP | 2016-180471 | A | 10/2016 | |
| JP | 6546511 | B2 * | 7/2019 | ........... B60K 5/1208 |
| JP | 6710101 | B2 * | 6/2020 | ........... B60K 5/1208 |
| JP | 2020159448 | A * | 10/2020 | ........... B60K 5/1208 |
| JP | 6808554 | B2 | 1/2021 | |

OTHER PUBLICATIONS

Abstract of Cn 109690126A.
Dec. 23, 2025 Office Action issued in Chinese Application No. 202211410312.0.

* cited by examiner

*Primary Examiner* — Melody M Burch
(74) *Attorney, Agent, or Firm* — Oliff PLC

(57) ABSTRACT

A vibration damping device including a main unit including first and second attachments connected by a rubber body, the second attachment including metallic first and second connectors inserted into metallic first and second grooves of a bracket. The metal is exposed on outer and lower faces of the first connector to be in metal-to-metal contact with groove-inside bottom and lower faces of the first groove. An upper urging rubber on the first connector contacts a groove-inside upper face of the first groove. The metal is exposed on a lower face of the second connector to be in metal-to-metal contact with a groove-inside lower face of the second groove. Upper and outer urging rubbers on the second connector contact groove-inside upper and bottom faces of the second groove. Detent engagers between the connectors and the grooves prevent dislodgment of the connectors from the grooves.

6 Claims, 11 Drawing Sheets

60

60

14

12    58

72a    72b

14

60    60

76    76

84    84

54a    54b

88

86    86

102

86    92    22    12    100

14  112

112

60    60

76    76

84    84

54a    54b 86    88

92    102

72a  22    12  72b

108

78

82

80

72b

54b

102

100

14

60

76    74  106

VIBRATION DAMPING DEVICE

INCORPORATED BY REFERENCE

The disclosure of Japanese Patent Application No. 2022-027811 filed on Feb. 25, 2022 including the specification, drawings and abstract is incorporated herein by reference in its entirety.

BACKGROUND ART

1. Technical Field

The present disclosure relates to a vibration damping device for use in an automotive engine mount or the like.

2. Description of the Related Art

Conventionally, a vibration damping device in which a vibration-damping device main unit is attached to a bracket from the lateral side has been known as one type of a vibration damping device such as an engine mount for use in a vehicle. Such a vibration-damping device main unit has a structure in which a first attachment member and a second attachment member, which are vertically remote from each other, are elastically connected by a main rubber elastic body. Besides, a pair of connecting grooves are formed in the opposed inner faces of the opposite leg parts of the bracket. A pair of connecting parts, which are provided on opposite sides of the second attachment member of the vibration-damping device main unit, are inserted to be fitted in and supported by the pair of connecting grooves of the bracket, whereby the vibration-damping device main unit is attached to the bracket from the lateral side.

Meanwhile, such a vibration damping device requires a mechanism for preventing the vibration-damping device main unit, which is attached to the bracket from the lateral side, from becoming dislodged from the bracket in the direction opposite to the direction of attachment.

Therefore, U.S. Pat. No. 9,593,732 B2 and Japanese Patent No. JP-B-6808554 propose a mechanism that adopts a second attachment member made of synthetic resin to form an engaging projection, and the engaging projection is engaged with an engaging receiver provided to a bracket by a snap fitting action or the like utilizing elastic deformation of a synthetic resin material, thereby preventing the vibration damping device from becoming dislodged from the bracket.

However, in the mechanism described in U.S. Pat. No. 9,593,732 B2 and JP-B-6808554, when the vibration-damping device main unit is attached to the bracket from the lateral side, it is necessary for the engaging projection of the second attachment member made of synthetic resin to be elastically deformed and engaged with the engaging receiver, and damage during deformation tends to be a problem.

Moreover, since the second attachment member in the vibration-damping device main unit needs to be made of synthetic resin, it may be difficult to achieve the required load-bearing capability and strength characteristics. Also, there is a possibility that time-dependent deterioration such as creep deformation may be a problem. Especially in engine mounts and the like, where the input load is large, due to dimensional changes in the connecting part of the second attachment member caused by deterioration of the synthetic resin over time, a gap may be generated between the connecting part and the connecting groove of the bracket, posing a risk of generating a noise due to rattling.

In view of such problems, the present applicant proposed in U.S. Pat. No. 9,931,923 B2 that the connecting part of the vibration-damping device main unit, which is inserted into the connecting groove of the bracket, has a composite structure in which a connecting part main body integrally formed with the second attachment member and an urging rubber are integrally provided by being vertically overlapped with each other. In the connecting part of such a composite structure, when the vibration-damping device main unit is attached to the bracket from the lateral side, the urging rubber actively undergoes elastic deformation, so that the deformation of the connecting part main body can be reduced or avoided, thereby preventing damage during attachment. Moreover, the second attachment member provided with the connecting part main body can be made of metal, thereby advantageously obtaining the load bearing capability and the strength characteristics of the second attachment member and the connecting part main body while avoiding time-dependent deterioration such as creep deformation as well.

However, further research conducted by the inventors led to the discovery that there is room for further improvement in the vibration damping device disclosed in U.S. Pat. No. 9,931,923 B2 as well. That is, in the vibration damping device disclosed in U.S. Pat. No. 9,931,923 B2, in the direction of opposition of the pair of connecting grooves provided to the bracket, the pair of connecting parts of the vibration-damping device main unit are positioned and supported by coming into contact with groove-inside bottom faces of the pair of connecting grooves via urging rubbers provided on the respective outer peripheral surfaces of the connecting parts.

Therefore, in the direction of opposition of the pair of connecting grooves, the vibration damping device is positioned with respect to the bracket due to the balance between the urging rubbers on the opposite sides, which sometimes makes it difficult to set the position with high accuracy. In addition, when the input load is large on one side of the direction of opposition of the pair of connecting grooves, there is a possibility that the interposition of the urging rubbers may make it difficult to achieve sufficient load-bearing capability.

SUMMARY

It is therefore one object of the present disclosure to provide a vibration damping device of novel structure which includes a novel dislodgment prevention mechanism capable of preventing damage to the connecting part or the like during attachment of the vibration-damping device main unit to the bracket from the lateral side in comparison with the ones described in U.S. Pat. No. 9,593,732 B2 and JP-B-6808554 thereby improving load-bearing characteristics, suppressing time-dependent deterioration and the like, and which is able to improve the positioning accuracy of the vibration-damping device main unit with respect to the bracket in the direction of opposition of the pair of connecting grooves while improving the load bearing capability on one side, and the like in comparison with the one described in U.S. Pat. No. 9,931,923 B2.

The above and/or optional objects of the present disclosure may be attained according to at least one of the following preferred embodiments of the disclosure. The following preferred embodiments and/or elements employed in each preferred embodiment of the disclosure may be adopted at any possible optional combinations.

A first preferred embodiment of the present disclosure is as described below.

A vibration damping device comprising:

a vibration-damping device main unit comprising a first attachment member and a second attachment member that are vertically remote from each other and are elastically connected by a main rubber elastic body, the second attachment member comprising a pair of connecting parts comprising a first connecting part and a second connecting part provided on opposite sides; and a bracket comprising opposite leg parts, the opposite leg parts comprising a pair of connecting grooves comprising a first connecting groove and a second connecting groove provided on opposed inner faces of the opposite leg parts, the vibration-damping device main unit being attached to the bracket from a lateral side by the pair of the connecting parts being inserted into the pair of the connecting grooves, wherein the pair of the connecting parts of the second attachment member and the pair of the connecting grooves of the bracket are all made of metal, the first connecting part, is configured such that the metal is exposed on an outer peripheral surface and a lower face to be in metal-to-metal contact with a groove-inside bottom face and a groove-inside lower face of the first connecting groove, and an upper urging rubber is provided on an upper face of the first connecting part to be in contact with a groove-inside upper face of the first connecting groove, the second connecting part is configured such that the metal is exposed on a lower face to be in metal-to-metal contact with a groove-inside lower face of the second connecting groove, and an upper urging rubber is provided on an upper face of the second connecting part to be in contact with a groove-inside upper face of the second connecting groove while an outer peripheral urging rubber is provided on an outer peripheral surface of the second connecting part to be in contact with a groove-inside bottom face of the second connecting groove, the outer peripheral surface of the first connecting part of the second attachment member is pressed against the groove-inside bottom face of the first connecting groove in metal-to-metal contact by an urging force of the outer peripheral urging rubber of the second connecting part being exerted on the second attachment member toward a lateral side, and between the outer peripheral surface of the first connecting part and the first connecting groove and between an inside surface of the second connecting part and the second connecting groove, there are provided respective detent engagers that prevent dislodgment of the first and second connecting parts which are held in an engaged state by the urging force of the outer peripheral urging rubber and inserted in the first and second connecting grooves.

In the vibration damping device of the present preferred embodiment, when the vibration-damping device main unit is attached to the bracket in a press-fitted state by inserting each connecting part into the connecting groove, the upper urging rubber is elastically deformed in the vertical direction, and the outer peripheral urging rubber is elastically deformed in the direction of opposition of the pair of connecting grooves, so that elastic deformation of the connecting part is not required. Therefore, by the second attachment member including the connecting parts being made of metal, it is possible to prevent damage to the second attachment member including the connecting parts during attachment of the vibration-damping device main unit to the bracket, while avoiding problems such as rattling and strength reduction due to time-dependent deterioration such as creep deformation in the member made of resin.

Moreover, the pair of connecting parts provided to the second attachment member made of metal is pressed against the connecting grooves of the bracket in metal-to-metal contact at the respective lower faces by the urging force of the upper urging rubbers provided on the respective upper faces. Therefore, it is possible to improve the load-bearing capability in the bound direction (the downward direction) in which a particularly large load is likely to be input.

In addition, the outer peripheral surface of the first connecting part is pressed against the groove-inside bottom face of the first connecting groove in metal-to-metal contact by the urging force of the outer peripheral urging rubber provided to the second connecting part. Therefore, the positioning accuracy of the vibration-damping device main unit with respect to the bracket is favorably obtained in the direction of opposition of the pair of connecting grooves as well. Besides, in the direction in which the first connecting part is pressed against the groove-inside bottom face of the first connecting groove in metal-to-metal contact, the load bearing capability can also be improved.

Furthermore, between the pair of connecting grooves and the pair of connecting parts inserted therein, there are provided respective detent engagers that prevent dislodgment of the connecting parts from the respective connecting grooves, so as to exhibit a large dislodgment prevention force. In addition, even when a large load is input in the direction of dislodgment, the rotational displacement and generation of a moment force in the rotational direction of the vibration-damping device main unit will be effectively suppressed, thereby more stably maintaining the attached state of the vibration-damping device main unit with respect to the bracket.

A second preferred embodiment of the present disclosure is as described below.

The vibration damping device according to the first preferred embodiment, wherein the detent engagers comprise:

a first concave-and-convex engager in which a stepped convex part provided on the groove-inside bottom face of the first connecting groove engages with a stepped concave part provided on the outer peripheral surface of the first connecting part; and a second concave-and-convex engager in which a stepped convex part provided on an inner wall part protruding from the groove-inside bottom face of the second connecting groove engages with a stepped concave part provided on the inside surface of the second connecting part.

In the vibration damping device of the present preferred embodiment, the engaging action between the stepped face of the concave part of each connecting part and the stepped face of the convex part of the corresponding connecting groove can prevent dislodgment of the each connecting part inserted into the corresponding connecting groove. Besides, since the stepped face of the concave part of each connecting part and the stepped face of the convex part of the corresponding connecting groove, which are engaged with each other, can provide metal-to-metal contact faces. Thus, the detent engager can be constituted with high strength and positioning capability, thereby advantageously obtaining the load bearing capability in the direction of dislodgment of the vibration damping device as well.

A third preferred embodiment of the present disclosure is as described below.

The vibration damping device according to the first or second preferred embodiment, wherein at least one of the detent engagers includes locking faces locked to each other in a direction of dislodgment of one of the first and second connecting parts inserted in a corresponding one of the first and second connecting grooves, the locking faces being located in a central region obtained by dividing the second attachment member into three equal parts in a direction of attachment to the bracket.

In the vibration damping device of the present preferred embodiment, in the direction of attachment of the vibration-damping device main unit to the bracket, the position of the locking faces of the detent engager can be set close to the position of the center axis of the vibration-damping device main unit extending in the vertical direction. Therefore, for example, it is possible to effectively prevent the vibration-damping device main unit from rattling in the rotational direction about the center axis by the locking action of the locking faces of the detent engager provided on the opposite sides.

A fourth preferred embodiment of the present disclosure is as described below.

The vibration damping device according to any of the first to third preferred embodiments, wherein in the first connecting part, the detent engager is provided partially in a vertical direction of the first connecting part.

In the vibration damping device of the present preferred embodiment, the detent engager constituted by, for example, the convex part of the connecting part, the concave part of the connecting groove, and the like is provided partially in the vertical direction. This makes it possible to more largely obtain a metal-to-metal contact area between the outer peripheral surface of the first connecting part and the groove-inside bottom face of the first connecting groove.

A fifth preferred embodiment of the present disclosure is as described below.

The vibration damping device according to any of the first to fourth preferred embodiments, wherein a distal end urging rubber is provided on a distal end face of the second attachment member in a direction of attachment from the lateral side to the bracket and is in contact with the bracket in the direction of attachment.

In the vibration damping device of the present preferred embodiment, the urging force of the distal end urging rubber is exerted on the vibration-damping device main unit in the direction opposite to the direction of attachment to the bracket. This makes it possible to hold the detent engager in the contact engaged state in which dislodgment of the connecting part from the connecting groove is prevented, so as to stabilize the positioned state of the connecting part in the direction of insertion with respect to the connecting groove, which is advantageous in preventing rattling or the like.

A sixth preferred embodiment of the present disclosure is as described below.

The vibration damping device according to any of the first to fifth preferred embodiments, wherein the groove-inside bottom face of at least one of the first and second connecting grooves has a guide taper at least in an opening portion on a side from which a corresponding one of the first and second connecting parts is inserted, the guide taper sloping to increase a groove depth from a far side toward an opening side in a direction of insertion of the corresponding one of the first and second connecting parts.

In the vibration damping device of the present preferred embodiment, the insertion of the connecting part into the connecting groove is facilitated by being guided by the guide taper. Thus, even when the urging force of the outer peripheral urging rubber provided to the connecting part is set large, the operation workability of the insertion of the connecting part into the connecting groove, and hence the attachment workability of the vibration-damping device main unit to the bracket can be favorably maintained.

According to the present disclosure, the second attachment member including the connecting parts can be made of metal. Besides, it is possible to support the second attachment member with respect to the bracket in the positioned state by the metal-to-metal contact of the connecting part with respect the bracket in each direction, namely in the vertical direction, in the direction of opposition of the pair of connecting grooves, and the direction of attachment of the vibration-damping device main unit to the bracket.

Therefore, in comparison with those disclosed in U.S. Pat. No. 9,593,732 B2 and JP-B-6808554, for example, the damage to the connecting part or the like during attachment of the vibration-damping device main unit to the bracket will be prevented, and time-dependent deterioration such as creep deformation at the connecting part will also be avoided. In addition, in comparison with the one disclosed in U.S. Pat. No. 9,931,923 B2, it is possible to improve the positioning accuracy of the vibration-damping device main unit with respect to the bracket in the direction of opposition of the pair of connecting grooves or the like.

BRIEF DESCRIPTION OF THE DRAWINGS

The foregoing and/or other objects, features and advantages of the disclosure will become more apparent from the following description of a practical embodiment with reference to the accompanying drawings in which like reference numerals designate like elements and wherein.

DETAILED DESCRIPTION

Figure 1A:
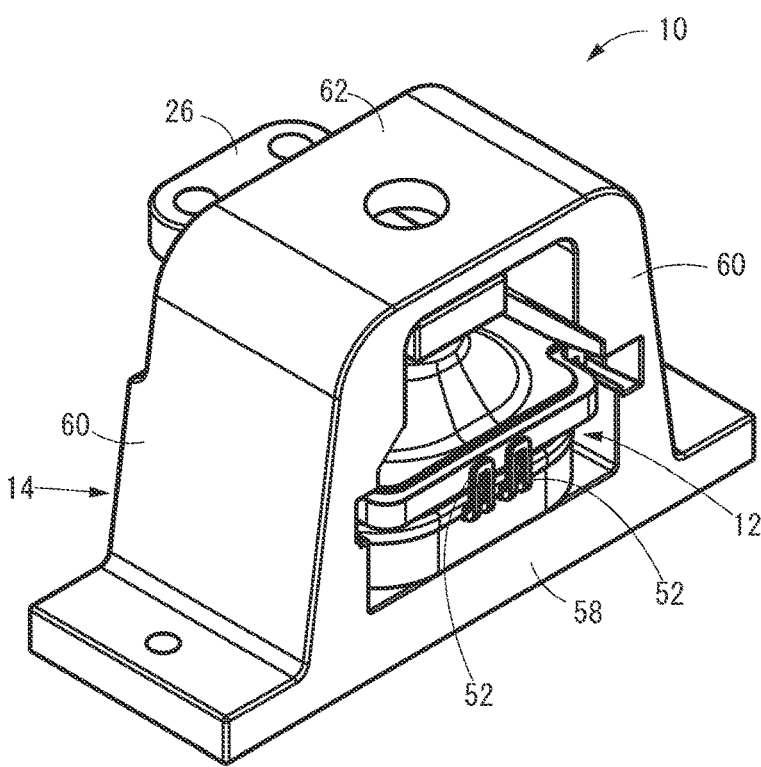
FIGS. 1A and 1B are overall perspective views showing a vibration damping device in the form of an engine mount as a first practical embodiment of the present disclosure.
Figure 1B:
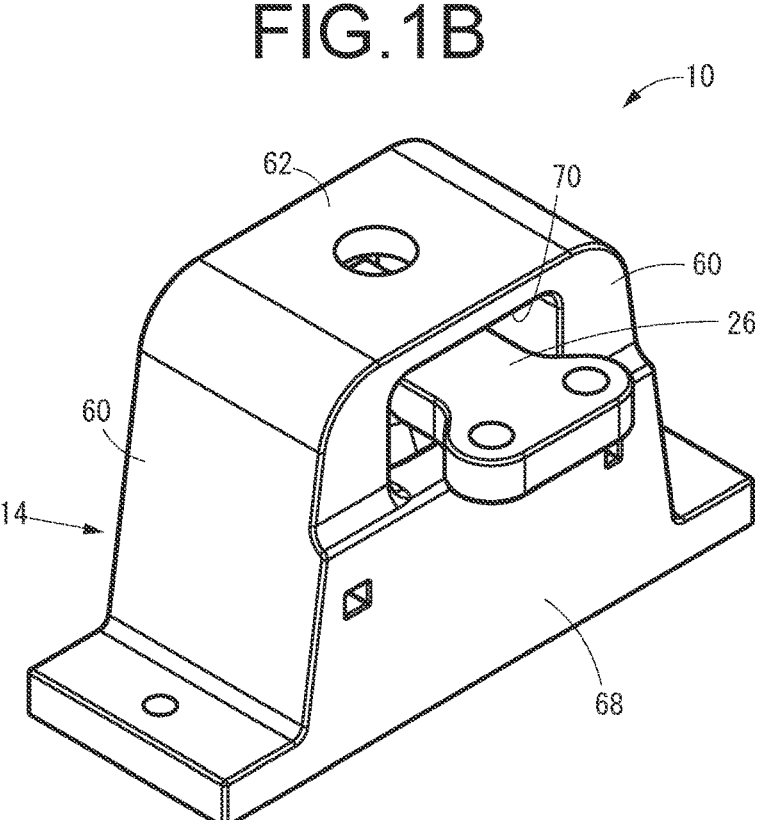
Figure 2:
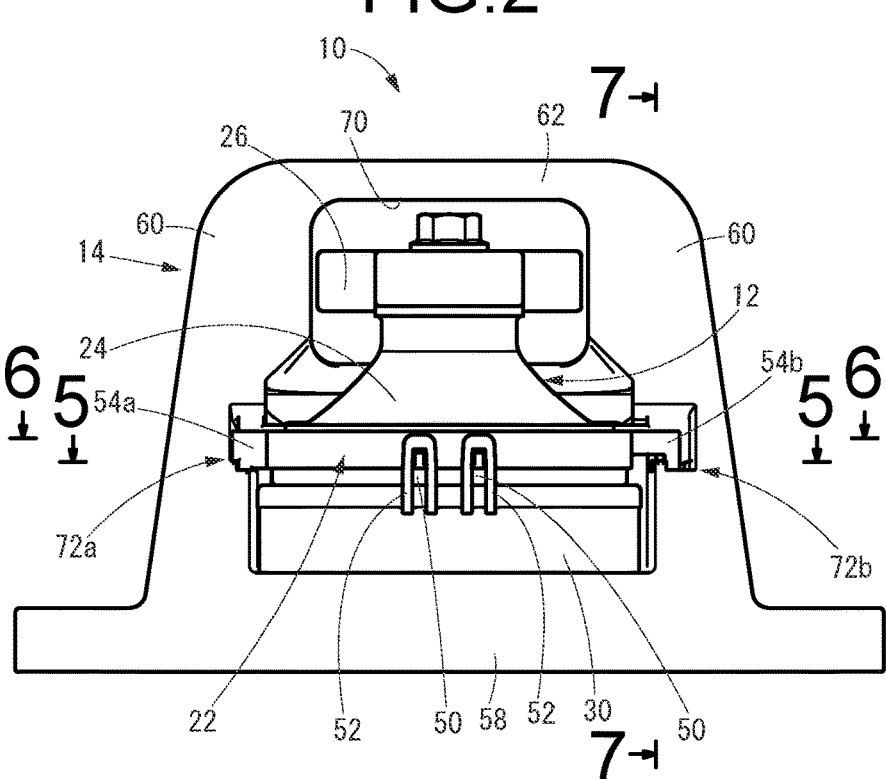
FIG. 2 is a front view of the engine mount shown in FIG. 1.
Figure 3:
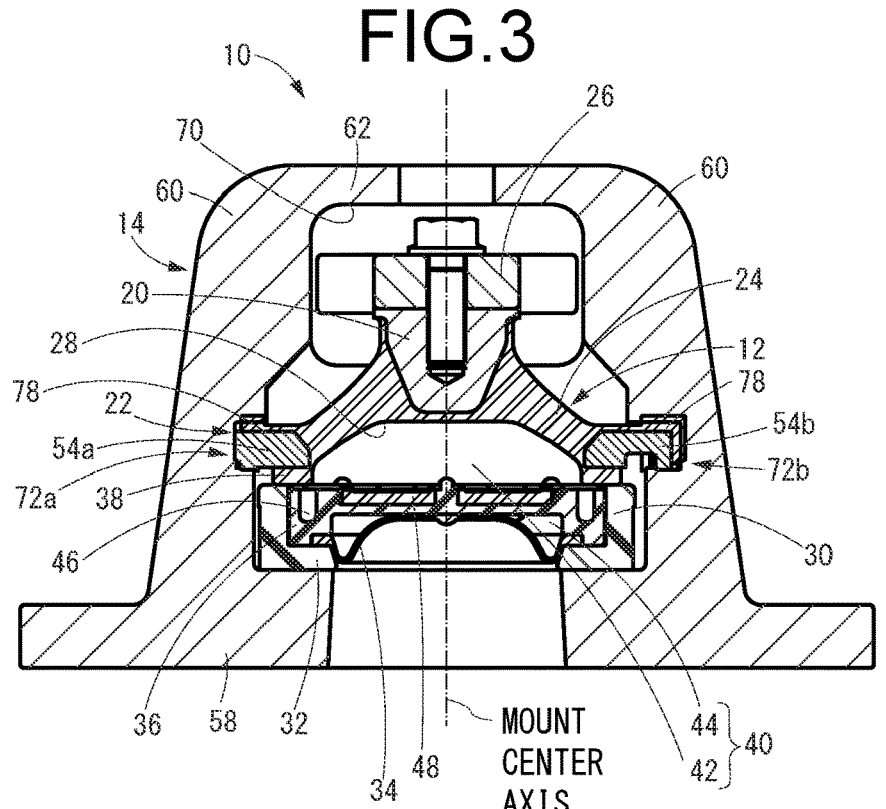
FIG. 3 is a vertical cross sectional view of the engine mount shown in FIG. 1.
Figure 4:
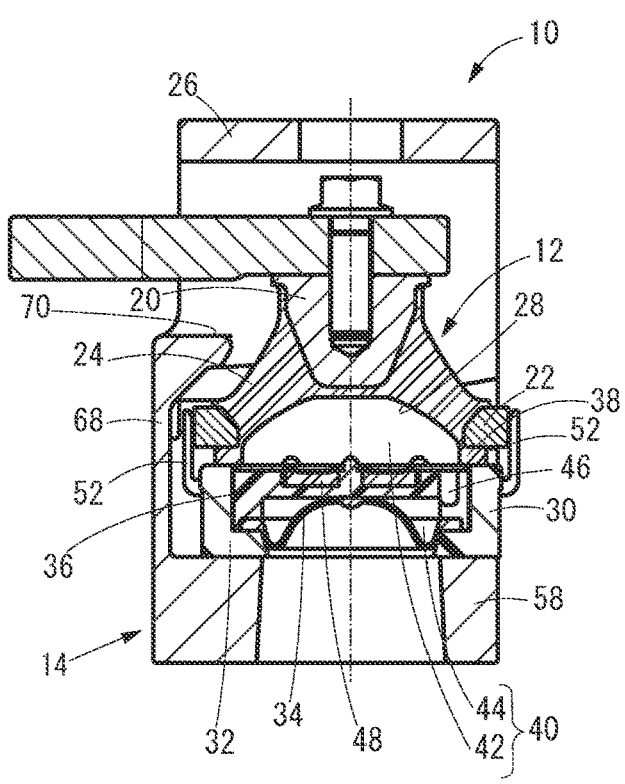
FIG. 4 is a vertical cross sectional view of the engine mount shown in FIG. 1, in a direction orthogonal to FIG. 3.
Figure 5:
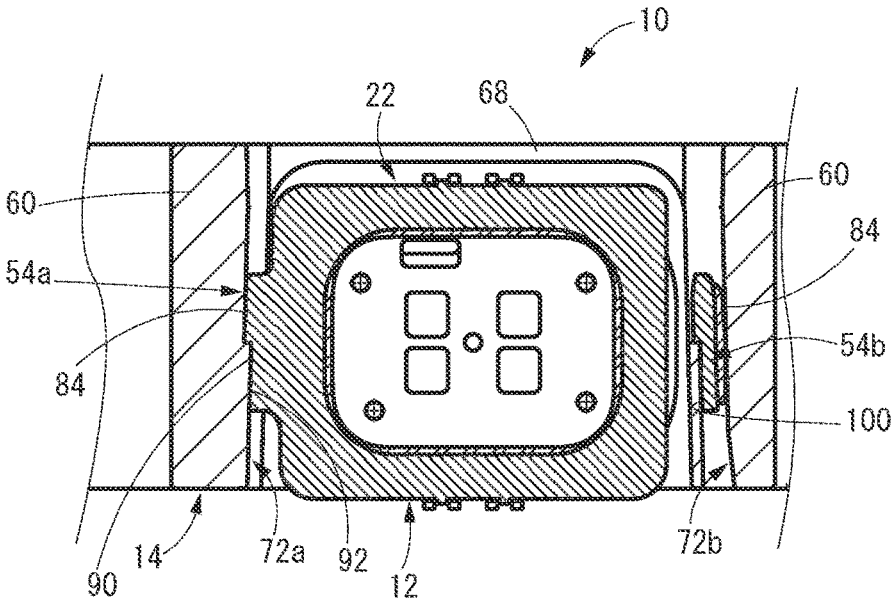
FIG. 5 is a cross sectional view taken along line 5-5 of FIG. 2.

Hereinafter, practical embodiments of the present disclosure will be described in reference to the drawings.

FIGS. 1 to 7 depict an automotive engine mount 10 as a first practical embodiment of a vibration damping device constructed according to the present disclosure. The engine mount 10 has a structure in which a mount main unit 12 serving as a vibration-damping device main unit is laterally inserted into a bracket 14 from the lateral side, so as to be attached by so-called lateral insertion. In the following description, as a general rule, the vertical direction refers to the vertical direction in FIG. 3, which is the direction along the mount center axis. Besides; it is assumed that the engine mount 10 of the present practical embodiment is installed between a body and a power unit of an automobile with the vertical direction in FIG. 3 being coincident with the vertical direction, the left-right direction in FIG. 3 being coincident with the vehicle front-back direction, and the direction perpendicular to the paper surface in FIG. 3 being coincident with the vehicle left-right direction. However, in order to make it easier to understand the drawings, in the following explanation, the left-right direction in FIG. 3 refers to the mount left-right direction, and the direction perpendicular to the paper surface in FIG. 3 refers to the mount front-back direction (or the far/near direction). In each figure, each rubber elastic body (the urging rubber) provided on the mount main unit 12 is shown as it is before attachment to the bracket 14, in order to make it easier to see whether or not the urging rubber is compressed when attached to the bracket 14.

Described more specifically, the mount main unit 12 has a structure in which a first attachment member 20 and a second attachment member 22 are elastically connected by a main rubber elastic body 24, as shown in FIGS. 8 to 11 in isolation in addition to FIGS. 1 to 7. A support load and a vibration of the power unit will be input across the first attachment member 20 and the second attachment member 22.

The first attachment member 20 is a high rigidity component made of metal or the like, and has a solid block structure such as a vertically inverted frustoconical shape. As illustrated in FIGS. 1 to 4, an attachment part 26 configured to be attached to the power unit or the like is fixed to the first attachment member 20 with a fixing bolt or the like.

Figure 6:
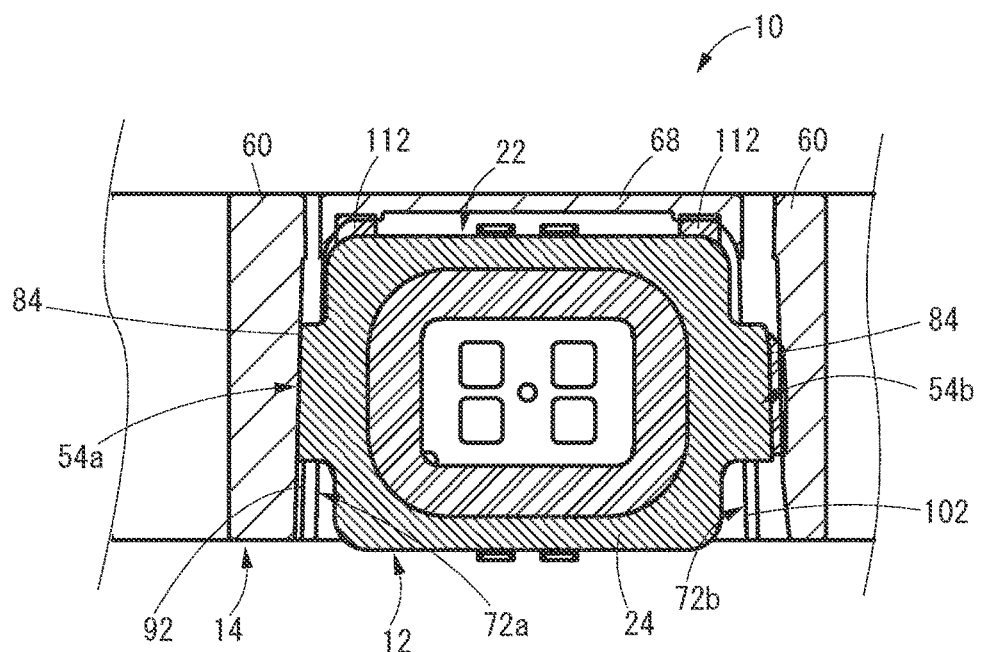
FIG. 6 is a cross sectional view taken along line 6-6 of FIG. 2.

The second attachment member 22 is a high rigidity component made of metal such as aluminum alloy or steel, and has an approximately thick-walled annular block shape overall. In the present practical embodiment in particular, as can be seen in FIG. 6, the second attachment member 22 includes a rounded rectangular through hole in the center, and has an approximately rectangular, thick-walled annular block shape overall.

The main rubber elastic body 24 elastically connecting the first attachment member 20 and the second attachment member 22 has an approximately oval shape or a rounded rectangular shape in the circumferential direction, and has an outer peripheral surface shape whose outer diameter dimension gradually becomes smaller from the bottom to the top. The first attachment member 20 is fastened to the upper-end, small-diameter portion of the main rubber elastic body 24 in an approximately embedded state so as to be inserted therein, while the second attachment member 22 is fastened to the lower-end, large-diameter outer peripheral portion thereof. The main rubber elastic body 24 desirably takes the form of an integrally vulcanization molded component incorporating the first and second attachment members 20, 22.

The main rubber elastic body 24 is provided with an inverted recess 28 that opens in the center of the lower face, and the recess 28 opens downward through the through hole of the second attachment member 22. Besides, a sealing member 30 is overlapped and attached on the second attachment member 22 from below.

The sealing member 30 is made of a rigid, synthetic resin material or the like, and has an approximately thick-walled annular block shape corresponding to the second attachment member 22. In addition, the sealing member 30 includes a support base part 32 protruding inward from the lower end, and the cross-sectional shape of the sealing member 30 has an approximately L shape. A flexible film 34 and an orifice member 36 are inserted into the sealing member 30 from above, and attached thereto in a housed state so as to be overlapped on the support base part 32. The flexible film 34 and the orifice member 36 are vertically sandwiched and fixedly supported between the second attachment member 22 and the sealing member 30 at their outer peripheral portions.

On the upper side of the sealing member 30, the space between the second attachment member 22 on one side and the sealing member 30 and the orifice member 36 on the other is sealed by sandwiching a sealing rubber 38 provided on the lower face of the second attachment member 22. Further, on the lower side of the sealing member 30, the space between the sealing member 30 and the orifice member 36 is sealed by vertically sandwiching the outer peripheral portion of the flexible film 34.

With this configuration, the recess 28 of the main rubber elastic body 24 is covered with the flexible film 34 and is liquid-tightly sealed, thereby defining a liquid chamber 40 filled with a predetermined liquid. Besides, the liquid chamber 40 is vertically partitioned by the approximately plate-shaped orifice member 36. On the upper side of the orifice member 36, formed is a pressure-receiving chamber 42 whose wall is partly constituted by the main rubber elastic body 24, and in which pressure fluctuations arise due to the vibration input. On the lower side of the orifice member 36, formed is a variable-capacity equilibrium chamber 44 whose wall is partly constituted by the flexible film 34 such as a diaphragm rubber thereby absorbing pressure fluctuations.

The pressure-receiving chamber 42 and the equilibrium chamber 44 communicates with each other through an orifice passage 46 provided in the orifice member 36, so that a vibration damping effect will be exhibited by utilizing the flow action of the fluid flowing through the orifice passage 46 when vibration is input. In the present practical embodiment, a housing area is formed so as to be located in the central portion of the orifice member 36 and to spread in the direction orthogonal to the mount center axis, and communicates with each of the pressure-receiving chamber 42 and the equilibrium chamber 44. The movable film 48 is housed within the housing area. For example, during input of a vibration in a high-frequency range, which exceeds the tuning frequency of the orifice passage 46, the pressure fluctuations in the pressure-receiving chamber 42 will be reduced or absorbed based on deformation or displacement of the movable film 48, thereby avoiding a significant development of high dynamic spring.

The specific structure of the liquid chamber 40, the tuning characteristics of the orifice passage 46, presence or absence of the high-frequency liquid pressure absorption mechanism by the movable film 48, and the like are not limited, but can be appropriately set depending on the required vibration damping characteristics. Besides, although the assembly structure of the sealing member 30 with respect to the second attachment member 22 is not limited, in the present practical embodiment, a locking mechanism by hooking using a resin hook is adopted.

Specifically, the locking mechanism is constituted by a locking claw 50 protruding from the outer peripheral surface of the second attachment member 22 and a flexible locking piece 52 extending upward from the outer peripheral surface of the sealing member 30. The locking claw 50 and the locking piece 52 are provided at positions corresponding to each other and form a pair, and a plurality of pairs are provided in the circumferential direction of the second attachment member 22 and the sealing member 30. In the present practical embodiment in particular, two pairs of the locking claws 50 and the locking pieces 52 are provided at each location extending approximately linearly on the opposite sides in the front-back direction of the second attachment member 22 and the sealing member 30.

The locking piece 52 has an approximately inverted U-shape so as to include a locking hole extending vertically in the central portion. By the locking claw 50 being hooked on the locking hole, the sealing member 30 is attached and fixed to the second attachment member 22. By the upper face of the sealing member 30 being overlapped with the lower face of the second attachment member 22 from below, and by the sealing rubber 38 being pressed against and brought closer to the said lower face, hooking of the locking claws 50 on the locking pieces 52 can be realized approximately simultaneously by utilizing elastic deformation and recovery of each locking piece 52.

Moreover, the second attachment member 22 to which the sealing member 30 is attached is provided with a pair of connecting parts 54a, 54b comprising a first connecting part 54a and a second connecting part 54b at the outer peripheral portions on the left and right opposite sides where the locking claws 50 are not formed. The connecting parts 54a, 54b extend linearly in the front-back direction while each having an approximately constant thickness. With the mount main unit 12 attached to the bracket 14, the second attachment member 22 is fixedly supported by the bracket 14 by utilizing these connecting parts 54a, 54b.

Figure 12:
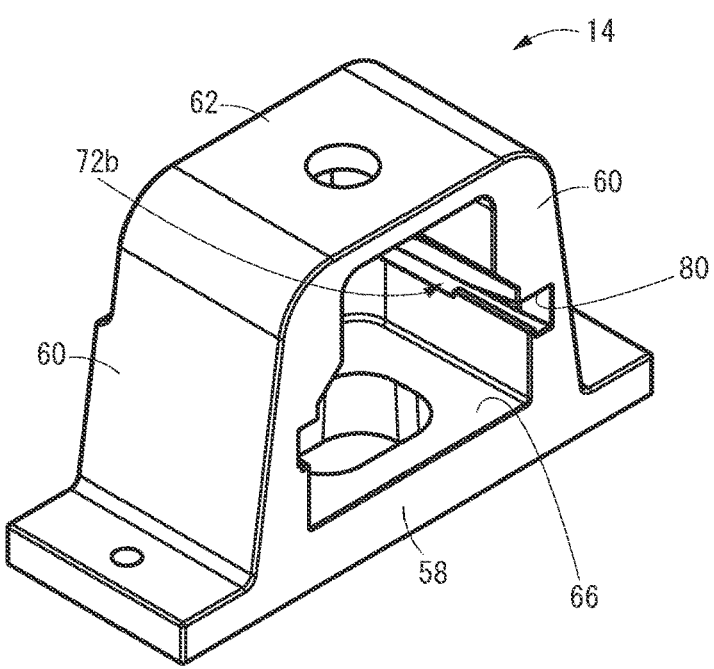
FIG. 12 is an overall perspective view showing a bracket of the engine mount shown in FIG. 1.
Figure 13:
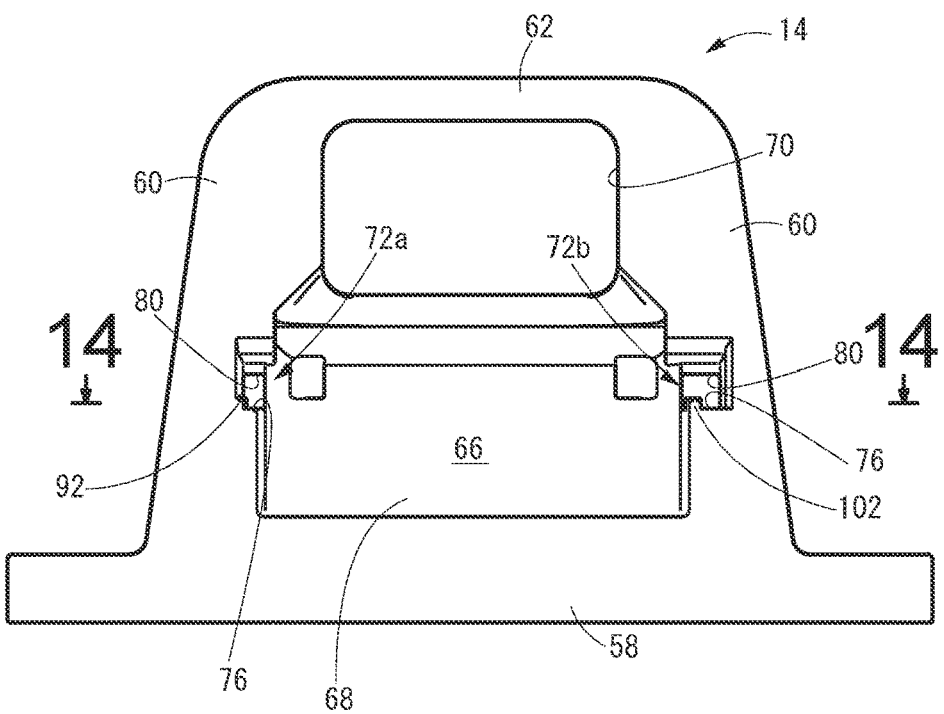
FIG. 13 is a front view of the bracket shown in FIG. 12.
Figure 14:
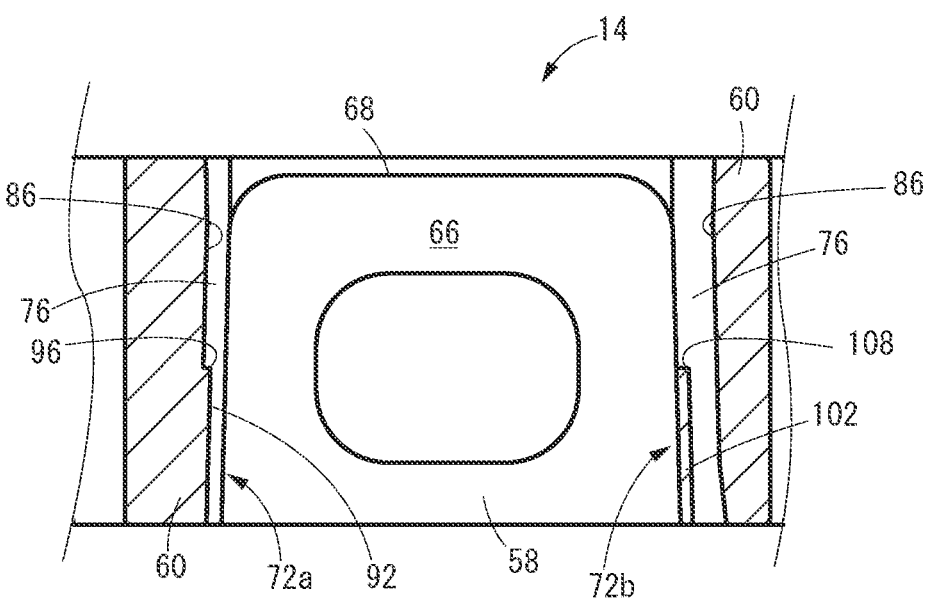
FIG. 14 is a cross sectional view taken along line 14-14 of FIG. 13.

The bracket 14 is a high rigidity component made of metal such as aluminum alloy, or fiber-reinforced resin, or the like. As shown in FIGS. 12 to 14 in addition to FIGS. 1 to 7, the bracket 14 integrally includes left and right attachment leg parts 60, 60 rising upward from the upper face of a base part 58 having a rectangular flat-plate shape, and a top plate part 62 integrally connecting the upper ends of the left and right attachment leg parts 60, 60. An installation space 66 in which the mount main unit 12 is attached is formed so as to open to the lateral side in a state of being surrounded by the base part 58, the left and right attachment leg parts 60, 60, and the top plate part 62.

A far wall 68 is integrally provided on the far side of the installation space 66 (the side opposite to the laterally opening side) so as to close the opening of the installation space 66. Besides, an insertion hole 70 through which the attachment part 26 is inserted for attachment to the mount main unit 12 (the first attachment member 20) in the upper portion of the far wall 68. The opposite sides of the base part 58 constitute fixing plate parts extending outward from the respective attachment leg parts 60, and the bracket 14 is configured to be fixed by bolting to the vehicle body side at the pair of fixing plate parts.

The left and right attachment leg parts 60, 60 are thick-wailed plates having a predetermined width dimension in the front-back direction, and are opposed to each other in the left-right direction. Further, the left and right attachment leg parts 60, 60 include connecting grooves 72a, 72b comprising a first connecting groove 72a and a second connecting groove 72b that open onto the opposed inner faces and extend in the front-back direction.

Figures 15A, 15B, 15C, 15D:
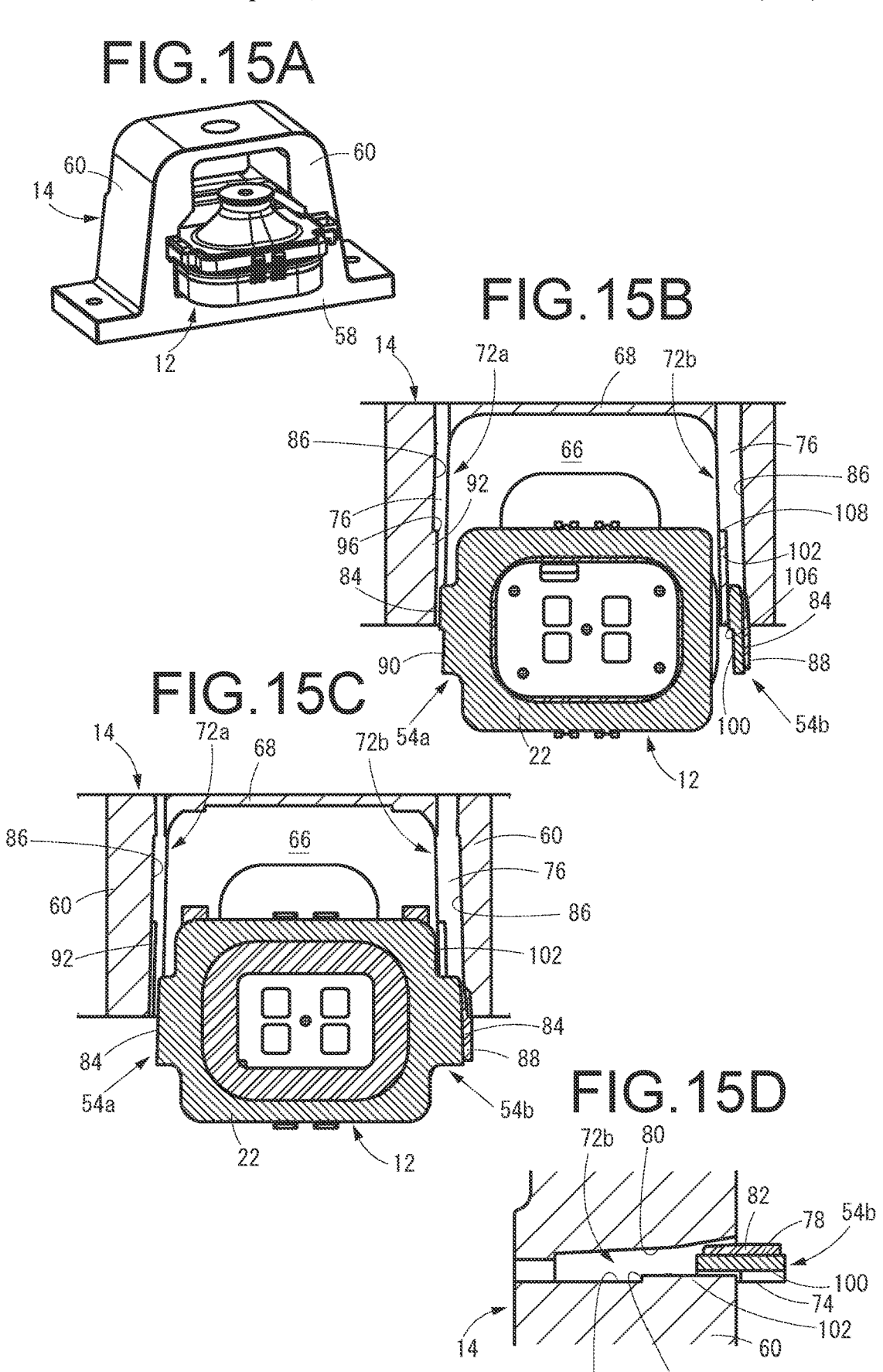
FIGS. 15A-15D are views suitable for explaining an initial state when the mount main unit shown in FIG. 8 is attached to the bracket shown in FIG. 12 from a lateral side.
Figures 16A, 16B, 16C, 16D:
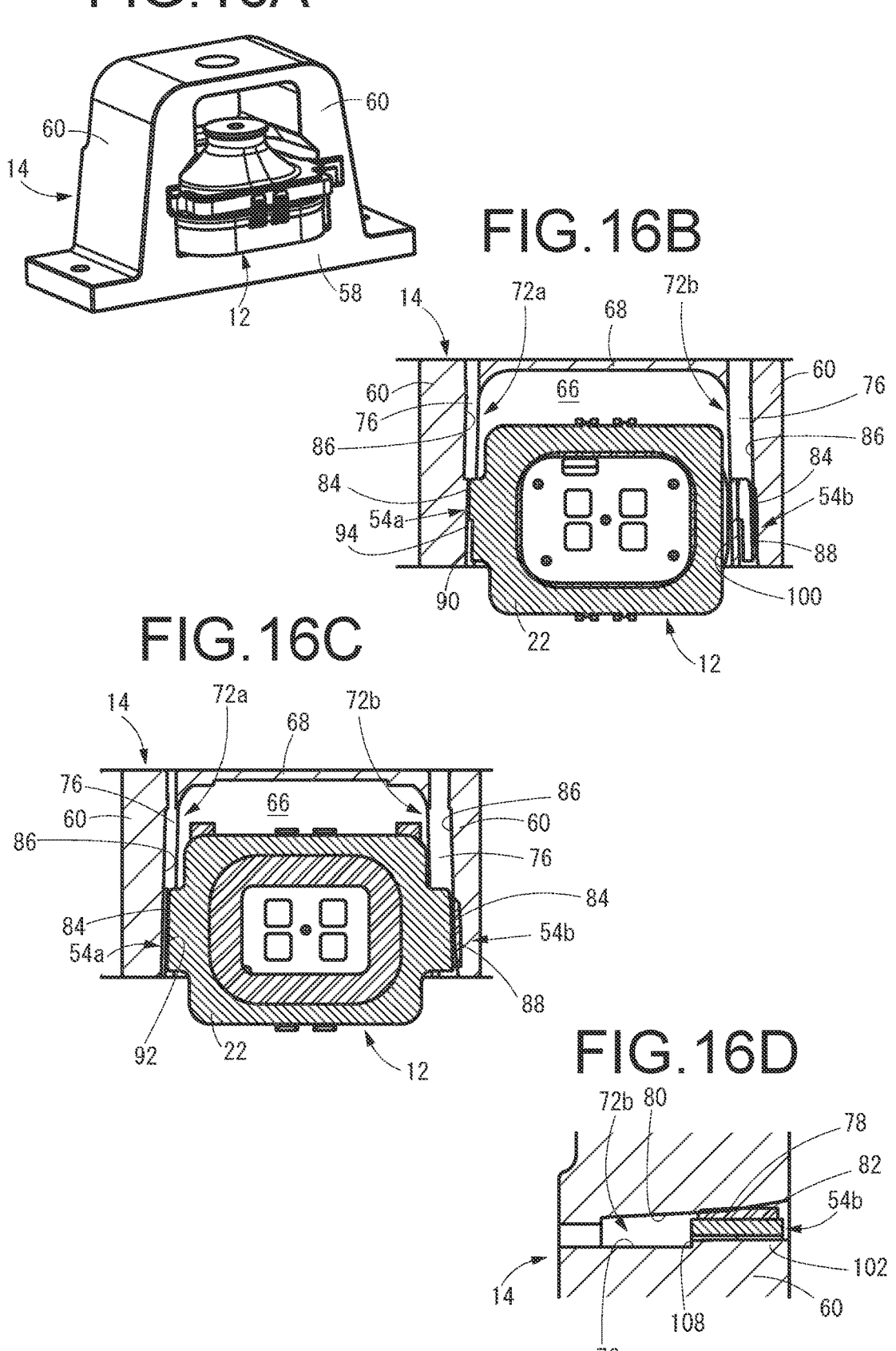
FIGS. 16A-16D are views suitable for explaining an intermediate state when the mount main unit shown in FIG. 8 is attached to the bracket shown in FIG. 12 from the lateral side.
Figures 17A, 17B, 17C, 17D:
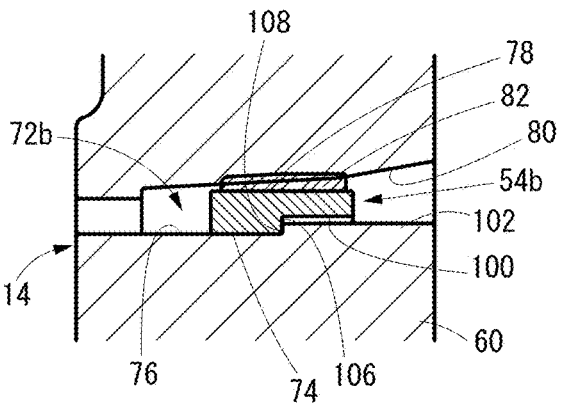
FIGS. 17A-17D are views suitable for explaining a final state when the mount main unit shown in FIG. 8 is attached to the bracket shown in FIG. 12 from the lateral side.

Then, the pair of connecting parts 54a, 54b provided to the second attachment member 22 of the mount main unit 12 are inserted into the pair of connecting grooves 72a, 72b from the lateral side, and the mount main unit 12 is laterally inserted into and attached to the bracket 14, as the attachment process shown in FIGS. 15 to 17 in sequence. In such an attachment state, the sealing member 30 of the mount main unit 12 is supported with the lower face of the bottom wall overlapped on the upper face of the base part 58 of the bracket 14 in a state of contact.

Here, the pair of connecting parts 54a, 54b and the pair of connecting grooves 72a, 72b each have a special feature configured such that with the mount main unit 12 attached to the bracket 14, the connecting parts 54a, 54b of the second attachment member 22 are positioned and fixedly supported by the connecting grooves 72a, 72b of the bracket 14.

Specifically, each connecting part 54 of the second attachment member 22 is provided at the left and right opposite end portions of the second attachment member 22 so as to extend in the middle portion in the front-back direction with a predetermined length. The second attachment member 22 made of metal is exposed on lower faces 74, 74 of the pair of connecting parts 54a, 54b, and extends linearly in the front-back direction with an approximately horizontal and flat metal surface, together with groove-inside lower faces 76, 76 of the corresponding connecting grooves 72a, 72b.

Here, upper faces 78, 78 of the pair of connecting parts 54a, 54b and groove-inside upper faces 80, 80 of the pair of connecting grooves 72a, 72b may also be flat surfaces extending approximately horizontally in the front-back direction. However, in the present practical embodiment, the groove-inside upper faces 80, 80 of the connecting grooves 72a, 72b have a sloping surface that slopes gradually upward toward the opening (the right end in FIG. 7) over a predetermined length on the opening side (the near side). With this configuration, improvement in workability of inserting the connecting parts 54a, 54b can be achieved.

Figure 7:
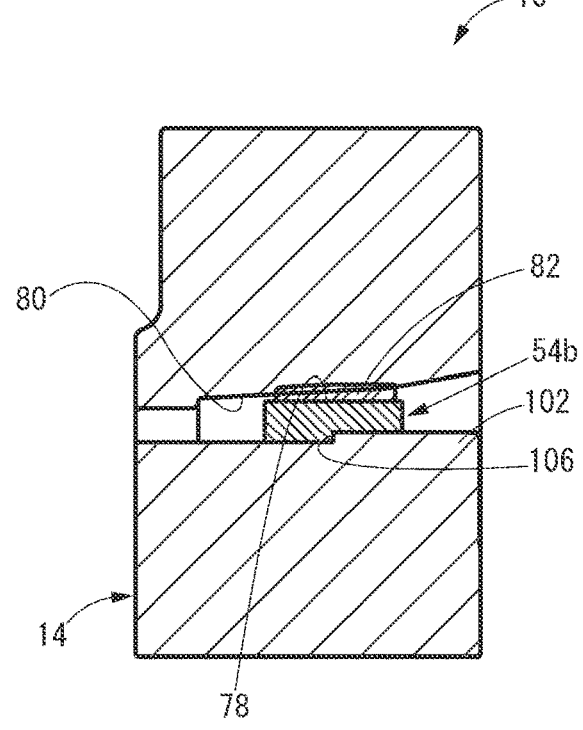
FIG. 7 is a cross sectional view taken along line 7-7 of FIG. 2.
Figure 8:
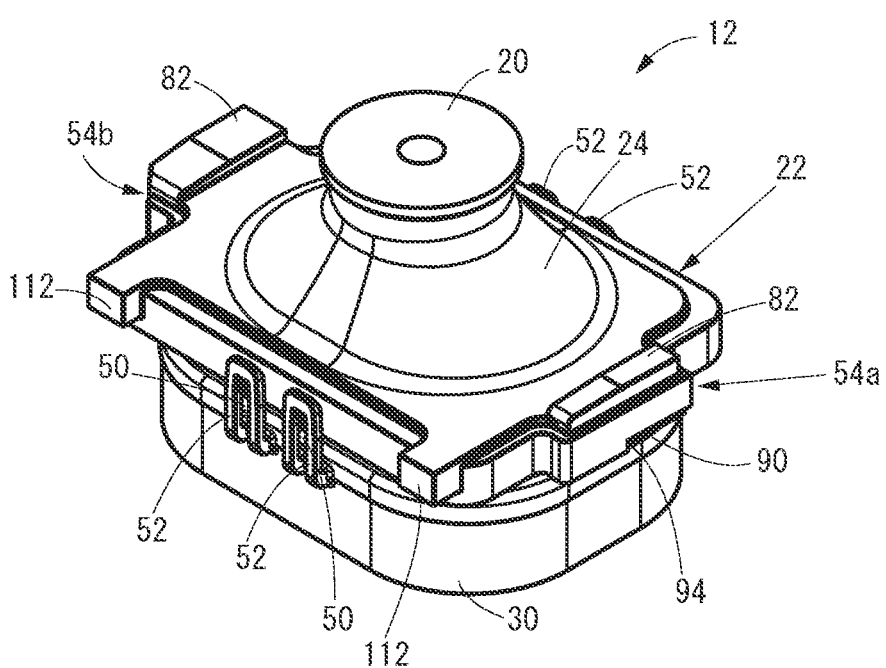
FIG. 8 is a perspective view showing a vibration-damping device main unit in the form of a mount main unit of the engine mount shown in FIG. 1 in its entirety viewed from a far side.
Figure 9:
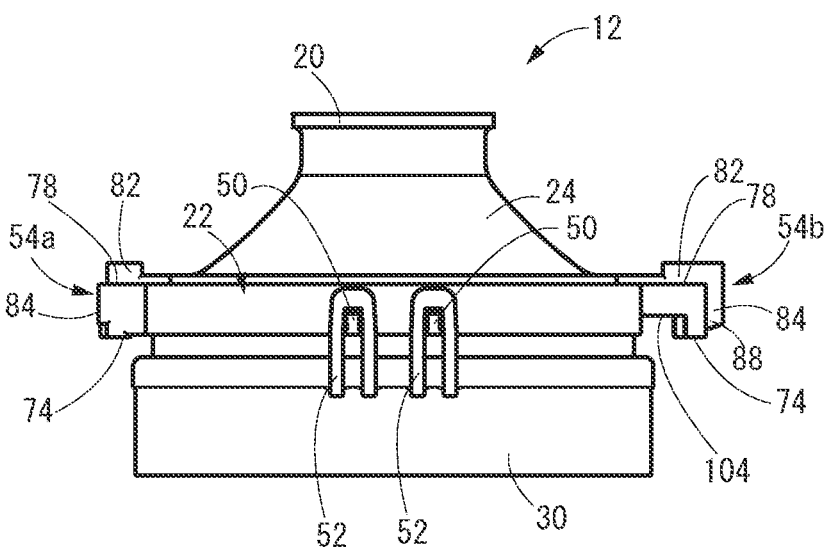
FIG. 9 is a front view of the mount main unit shown in FIG. 8.
Figure 10:
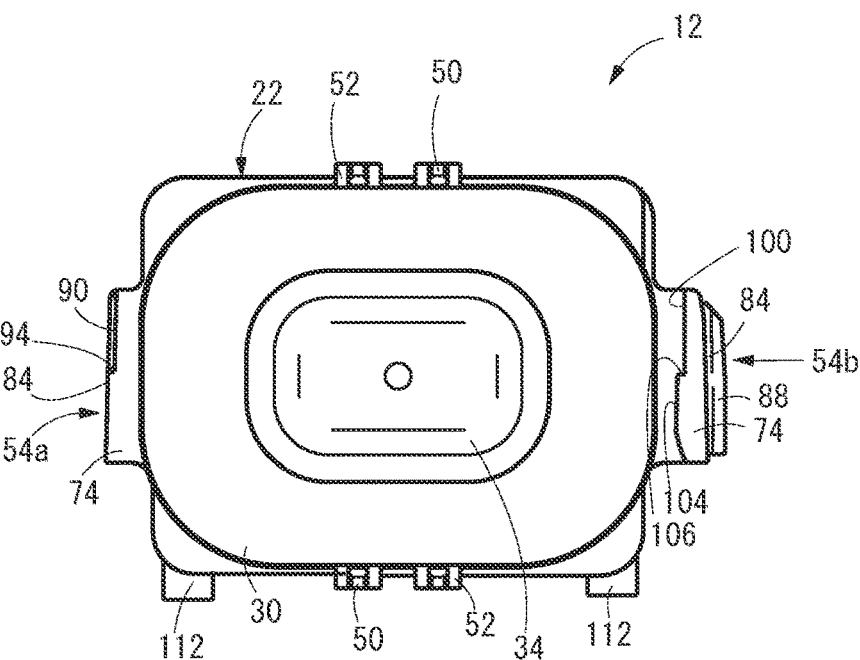
FIG. 10 is a bottom plan view of the mount main unit shown in FIG. 8.
Figure 11:
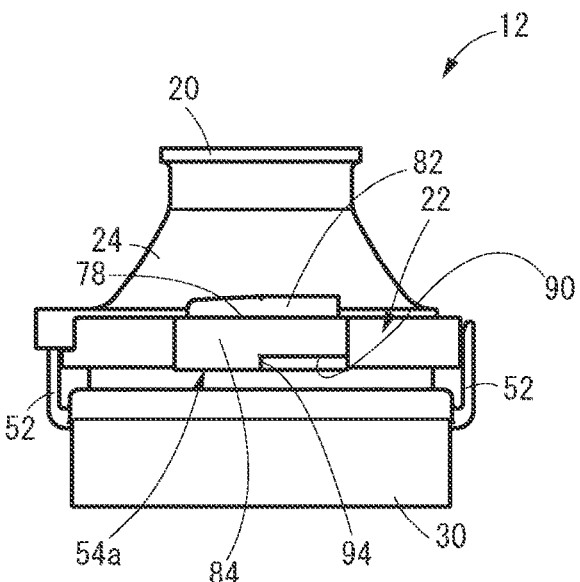
FIG. 11 is a left side view of the mount main unit shown in FIG. 8.

As can be understood from FIG. 7 and the like, the vertical thickness dimension of the pair of connecting parts 54a, 54b is slightly smaller than the groove-inside vertical dimension (the groove width dimension) of the pair of connecting grooves 72a, 72b. Besides, upper urging rubbers 82, 82 are provided on the respective upper faces 78, 78 of the pair of connecting parts 54a, 54b.

The thickness dimension of the upper urging rubbers 82, 82 (the projecting height dimension upward from the connecting parts 54a, 54b) is larger than the differential between the vertical thickness dimension of the connecting parts 54*a*, 54*b* and the groove-inside vertical dimension of the connecting grooves 72*a*, 72*b*. With this configuration, regarding the second attachment member 22 attached to the bracket 14 by the pair of connecting parts 54*a*, 54*b* being inserted into the pair of connecting grooves 72*a*, 72*b*, due to the repulsive elastic force of the upper urging 5 rubbers 82, 82 that are in contact with and compressed by the groove-inside upper faces 80, 80 of the connecting grooves 72*a*, 72*b*, the lower faces 74, 74 of the pair of connecting parts 54*a*, 54*b* are pressed against and positioned by the groove-inside lower faces 76, 76 of the connecting grooves 72*a*, 72*b* in metal-to-metal contact.

In addition, outer peripheral surfaces 84, 84 of the pair of connecting parts 54*a*, 54*b* may extend in parallel to each other in the front-back direction with a constant width in the vertical direction. However, in the present practical embodiment, the outer peripheral surfaces 84, 84 comprise sloping surfaces whose projecting height to the radial outside gradually and slightly increases from the far side (the forward side, which is the upper side in FIG. 6) toward the near side (the backward side, which is the lower side in FIG. 6).

As can be understood from FIG. 6 and the like, the left-right separation dimension between the outer peripheral surfaces 84, 84 of the pair of connecting parts 54*a*, 54*b*, that is, the member external size in the left-right direction of the second attachment member 22 at the portion forming the connecting parts 54*a*, 54*b*, is slightly smaller than the distance between opposed groove-inside bottom faces 86, 86 of the pair of connecting grooves 72*a*, 72*b*. Besides, the outer peripheral surface 84 of the first connecting part 54*a* (the connecting part on the left side in FIGS. 2, 3, 5, and 6) comprises a metal surface on which the second attachment member 22 made of metal is exposed, and is overlapped on the metal surface of the groove-inside bottom face 86 of the first connecting groove 72*a*.

Here, the groove-inside bottom faces 86, 86 of the pair of connecting grooves 72*a*, 72*b* have a planar shape corresponding to the outer peripheral surfaces 84, 84 of the pair of connecting parts 54*a*, 54*b*, and are configured to be in metal-to-metal contact over approximately the entire surface. That is, in the present practical embodiment, the groove-inside bottom faces 86, 86 of the pair of connecting grooves 72*a*, 72*b* correspond to the outer peripheral surfaces 84, 84 of the pair of connecting parts 54*a*, 54*b*, and comprise sloping surfaces in which the distance between opposed faces of the groove-inside bottom faces 86, 86 gradually increases from the far side toward the near side. In the present practical embodiment in particular, approximately the entire opposed inner faces of the pair of attachment leg parts 60, 60 of the bracket 14 comprise sloping surfaces in which the distance between opposed faces thereof gradually increases from the far side toward the near side. With this configuration, the connecting grooves 72*a*, 72*b* having the sloping groove-inside bottom faces 86, 86 have an approximately constant groove depth dimension from the near side toward the far side.

Furthermore, an outer peripheral urging rubber 88 is provided on the outer peripheral surface 84 of the second connecting part 54*b* over approximately the entire face thereof. The thickness dimension of the outer peripheral urging rubber 88 (the projecting height dimension to the lateral side from the second connecting part 54*b*) is larger than the differential between the left-right separation dimension between the outer peripheral surfaces 84, 84 of the pair of connecting parts 54*a*, 54*b*, and the distance between the opposed groove-inside bottom faces 86, 86 of the pair of connecting grooves 72*a*, 72*b*.

With this configuration, regarding the second attachment member 22 attached to the bracket 14 by the pair of connecting parts 54*a*, 54*b* being inserted into the pair of connecting grooves 72*a*, 72*b*, due to the repulsive elastic force of the outer peripheral urging rubber 88 that is in contact with and compressed by the groove-inside bottom face 86 of the second connecting groove 72*b* on the second connecting part 54*b* side, the outer peripheral surface 84 of first connecting part 54*a* is pressed against and positioned by the groove-inside bottom face 86 of the first connecting groove 72*a* in metal-to-metal contact.

Furthermore, between the first connecting part 54*a* and the first connecting groove 72*a* and between the second connecting part 54*b* and the second connecting groove 72*b*, there are provided respective detent engagers that prevent dislodgment of the pair of connecting parts 54*a*, 54*b*, which are held in an engaged state by the urging force of the outer peripheral urging rubber 88 and inserted in the pair of connecting grooves 72*a*, 72*b*.

In the present practical embodiment, the detent engager between the first connecting part 54*a* and the first connecting groove 72*a*, which serves as a first concave-and-convex engager, is constituted by a stepped concave part 90 provided on the outer peripheral surface 84 of the first connecting part 54*a* and a stepped convex part 92 provided on the groove-inside bottom face of the first connecting groove 72*a*.

The stepped concave part 90 of the first connecting part 54*a* is formed in the outer peripheral surface 84 of the first connecting part 54*a* with a notch shape extending forward from the back end to approximately the center. The stepped face, which is the forward side end face of the stepped concave part 90, constitutes a locking face 94 having a flat surface that extends in the vertical and left-right directions and is orthogonal to the front-back direction. In the present practical embodiment in particular, the stepped concave part 90 is formed with a size from the lower end of the first connecting part 54*a* to the vertically middle portion thereof. With this configuration, in the first connecting part 54*a*, it is possible to prevent the stepped concave part 90 from causing a great loss of the metal-to-metal contact area of the first connecting groove 72*a* with the groove-inside bottom face 86, thereby improving load bearing capability or the like at the metal-to-metal contact face.

The stepped convex part 92 of the first connecting groove 72*a* is formed in the groove-inside bottom face 86 of the first connecting groove 72*a* in a ridge shape extending forward from the back end to approximately the center. The stepped face, which is the forward side end face of the stepped convex part 92, constitutes a locking face 96 having a flat surface that extends in the vertical and left-right directions and is orthogonal to the front-back direction. In the present practical embodiment in particular, the stepped convex part 92 is formed with a size from the lower end of the groove-inside bottom face 86 of the first connecting groove 72*a* to the vertically middle portion thereof.

With this configuration, the stepped convex part 92 of the first connecting groove 72*a* enters the stepped concave part 90 of the first connecting part 54*a* and is approximately housed therein, and the locking face 94 of the first connecting part 54*a* comes into contact with the locking face 96 of the stepped convex part 92 from the far side toward the near side. This will prevent the first connecting part 54*a* inserted in the first connecting groove 72*a* from becoming dislodged toward the near side. In the present practical embodiment in particular, the locking face 94 and the locking face 96, which come into contact with each other, are overlapped in metal-to-metal contact, thereby improving the load bearing capability. Besides, the contact positions of these locking faces 94, 96 are located in the central region obtained by dividing the second attachment member 22 into three equal parts in the direction of attachment to the bracket 14 (the vertical direction in FIG. 5). Thus, for example, rattling in the direction of rotation about the center axis of the mount main unit 12 or the like can be effectively suppressed by the locking action due to the contact between the locking faces 94, 96.

Further, in the present practical embodiment, the detent engager between the second connecting part 54b and the second connecting groove 72b, which serves as a second concave-and-convex engager, is constituted by a stepped concave part 100 provided in the inside portion of the second connecting part 54b and a stepped convex part 102 provided in the opening portion of the second connecting groove 72b.

That is, on the radial inside of the second connecting part 54b, a front-back groove 104 is formed so as to open onto the lower face and extend in the front-back direction. The stepped concave part 100 is formed on the outside wall face of the front-back groove 104 with a notch shape extending forward from the back end to approximately the center. The stepped face, which is the forward side end face of the stepped concave part 100, constitutes a locking face 106 having a flat surface that extends in the vertical and left-right directions and is orthogonal to the front-back direction.

The stepped convex part 102 of the second connecting groove 72b is formed by an inner wall part protruding upward from the groove-inside lower face 76 of the second connecting groove 72b. That is, the inner wall part 102 serving as the stepped convex part has a vertical wall shape extending forward from the back end of the second connecting groove 72b to approximately the center along the opening end edge of the second connecting groove 72b with an approximately constant cross-sectional shape. The stepped face, which is the forward side end face of the stepped convex part 102, constitutes a locking face 108 having a flat surface that extends in the vertical and left-right directions and is orthogonal to the front-back direction.

With this configuration, the stepped convex part (the inner wall part) 102 of the second connecting groove 72b enters the stepped concave part 100 of the second connecting part 54b and is approximately housed therein, and the locking face 106 of the second connecting part 54b comes into contact with the locking face 108 of the stepped convex part 102 from the far side toward the near side. This will prevent the second connecting part 54b inserted in the second connecting groove 72b from becoming dislodged toward the near side. In the present practical embodiment in particular, the locking face 106 and the locking face 108, which come into contact with each other, are overlapped in metal-to-metal contact, thereby improving the load bearing capability.

In addition, in the present practical embodiment, the locking faces 94, 96 at the detent engager of the first connecting part 54a and the first connecting groove 72a, and the locking faces 106, 108 at the detent engager of the second connecting part 54b and the second connecting groove 72b, are set at approximately the same position in the front-back direction, and are positioned on the left and right opposite sides on a straight line including the mount center axis. With this arrangement, dislodgment prevention force for the mount main unit 12 from the bracket 14 will be exhibited more stably and efficiently.

With the mount main unit 12 attached to the bracket 14, the stepped concave part 90 and the stepped convex part 92 at the detent engager of the first connecting part 54a and the first connecting groove 72a, and the stepped concave part 100 and the stepped convex part 102 at the detent engager of the second connecting part 54b and the second connecting groove 72b may both be in contact with each other in the left-right direction. However, in preferred practice, they are opposed to each other in the left-right direction with a slight gap. With this configuration, the contact state between the outer peripheral surface 84 of the first connecting part 54a and the groove-inside bottom face 86 of the first connecting groove 72a can be manifested with more stability.

Meanwhile, the fixedly supported state of the second attachment member 22 to the bracket 14 by attaching the pair of connecting parts 54a, 54b to the pair of connecting grooves 72a, 72b as described above is realized by the following procedure. Namely, as shown in FIGS. 15 to 17, the pair of connecting parts 54a, 54b are inserted into the pair of connecting grooves 72a, 72b from the near side toward the far side and pushed forward, and are press-fitted until the second attachment member 22 reaches an approximately housed position in the bracket 14.

First, as shown in FIG. 15, the pair of connecting parts 54a, 54b of the second attachment member 22 are inserted into the pair of connecting grooves 72a, 72b of the bracket 14 from the near-side opening part such that the mount main unit 12 is inserted from the opening portion of the installation space 66 of the bracket 14. At this time, the distance between the opposed faces of the groove-inside bottom faces 86, 86 of the pair of connecting grooves 72a, 72b increases outward in the left-right direction from the far side toward the near side, while the dimension in the left-right direction between the outer peripheral surfaces 84, 84 of the pair of connecting parts 54a, 54b decreases toward the forward side (the far side) in the direction of insertion. Thus, the pair of connecting parts 54a, 54b can be easily inserted into the pair of connecting grooves 72a, 72b. In particular, in the second connecting groove 72b, the outward slope angle of the groove-inside bottom face 86 is made even larger in proximity to the near-side end so as to have a guide taper (see FIGS. 6, 14, etc.), so that the outer peripheral urging rubber 88 is prevented from being caught. Besides, in the vertical direction as well, the groove-inside upper faces 80, 80 of the respective connecting grooves 72a, 72b gradually slope upward from the far side toward the near side, and the slope angle is made even larger particularly in proximity to the near-side end (see FIGS. 7, 15, etc.). Thus, the upper urging rubbers 82, 82 are prevented from being caught, and the insertion of the connecting parts 54a, 54b into the connecting grooves 72a, 72b is even easier. Here, the outer peripheral urging rubber 88 and the upper urging rubbers 82, 82 may have a tapered shape in which the rubber thickness dimension is made small at the forward side end in the direction of insertion, and gradually becomes thicker toward the backward side in the direction of insertion, for example. This configuration makes it possible to further facilitate the insertion of the connecting parts 54a, 54b into the connecting grooves 72a, 72b.

Moreover, as shown in FIG. 16, the pair of connecting parts 54a, 54b inserted into the pair of connecting grooves 72a, 72b of the bracket 14 is pushed toward the far side. At that time, the lower faces 74, 74 of the respective connecting parts 54a, 54b are overlapped on the groove-inside lower faces 76, 76 of the connecting grooves 72a, 72b in metal-to-metal contact, and the flat lower faces 74, 74 are guided to move toward the far side so as to be slid on the flat groove-inside lower faces 76, 76. Here, at the second connecting part 54b, the outer peripheral urging rubber 88 comes into contact with the groove-inside bottom face 86 of the second connecting groove 72b, and the compression reaction force presses the entire second attachment member 22 leftward. However, the outer peripheral surface 84 of first connecting part 54a comes into contact with the stepped convex part (the inner wall part) 92 formed in the first connecting groove 72a, and moves toward the far side on the said stepped convex part 92 in a state of being separated from the groove-inside bottom face 86 of the first connecting groove 72a.

Then, as shown in FIG. 17, when the pair of connecting parts 54a, 54b are pushed to the farthest side along the pair of connecting grooves 72a, 72b of the bracket 14, the locking face 94 of the stepped concave part 90 formed on the first connecting part 54a reaches the locking face 96 of the stepped convex part 92 of the first connecting groove 72a, so that the outer peripheral surface 84 of the first connecting part 54a is released from the contact state with the stepped convex part (the inner wall part) 92 formed in the first connecting groove 72a. Approximately at the same time, the locking face 106 of the stepped concave part 100 formed on the second connecting part 54b reaches the locking face 108 of the stepped convex part 102 of the second connecting groove 72b, so that the outer peripheral surface 84 of the second connecting part 54b is released from the contact state with the stepped convex part (the inner wall part) 102 formed in the second connecting groove 72b. Accordingly, the entire second attachment member 22 moves leftward due to the compression reaction force of the outer peripheral urging rubber 88. As a result, the outer peripheral surface 84 of the first connecting part 54a can be held in a pressed state by being in metal-to-metal contact with the groove-inside bottom face 86 of the first connecting groove 72a.

Also, as shown in FIG. 17, in the attached state in which the pair of connecting parts 54a, 54b are pushed to the farthest side with respect to the pair of connecting grooves 72a, 72b, the locking face 94 of the stepped concave part 90 of the first connecting part 54a is overlapped in metal-to-metal contact with the locking face 96 of the stepped convex part 92 of the first connecting groove 72a from the far side toward the near side in the direction of attachment of the second attachment member 22 to the bracket 14. In addition, the locking face 106 of the stepped concave part 100 of the second connecting part 54b is overlapped in metal-to-metal contact with the locking face 108 of the stepped convex part 102 of the second connecting groove 72b from the far side toward the near side in the direction of attachment of the second attachment member 22 to the bracket 14. The contact on the first and second sides prevents dislodgment of the second attachment member 22 from the bracket 14.

In the present practical embodiment in particular, a distal end urging rubber 112 protruding radially outward (to the far side) is provided on the distal end face of the second attachment member 22 in the direction of attachment to the bracket 14. In the attached state shown in FIG. 17C, by the distal end urging rubber 112 coming into contact with the far wall 68 of the bracket 14, its elastic contact reaction force acts so as to press the locking faces 94, 106 of the connecting parts 54a, 54b and the locking faces 96, 108 of the connecting grooves 72a, 72b in the direction of contact. By so doing, the locking faces 94, 106 of the connecting parts 54a, 54b and the locking faces 96, 108 of the connecting grooves 72a, 72b are held in contact with each other, thereby prevent rattling or the like.

As is apparent from the above description, the second attachment member 22 is positioned with respect to the bracket 14 in metal-to-metal contact in the vertical direction, and is also positioned in metal-to-metal contact in the left-right direction, and furthermore, is positioned in metal-to-metal contact in the front-back direction. This makes it possible to position and support the second attachment member 22 with respect to the bracket 14 with high accuracy and a high load bearing capability.

Besides, when the second attachment member 22 is attached to the bracket 14, the flat lower faces 74, 74 of the pair of connecting parts 54a, 54b are guided so as to slide on the flat groove-inside lower faces 76, 76 of the pair of connecting grooves 72a, 72b, and the second attachment member 22 moves approximately in parallel to be attached, thereby avoiding tilt of the second attachment member 22 with respect to the bracket 14 during the attachment operation. This makes it possible to easily attach the second attachment member 22 to the bracket 14, as well as to avoid partial or temporary deterioration in sealing performance between the second attachment member 22 and the sealing member 30, liquid leakage, and the like during attachment of the second attachment member 22 to the bracket 14 due to, for example, the entire mount main unit 12 tilting to cause the sealing member 30 engaged by hooking with the second attachment member 22 to locally and strongly come into contact with the base part 58 of the bracket 14, or the like.

While the present disclosure has been described in detail hereinabove in terms of the practical embodiments, the disclosure is not limited by the specific description thereof. For example, the upper urging rubber 82, the outer peripheral urging rubber 88, and the like may be integrally formed with the main rubber elastic body 24 or may be formed separately. Further, the upper urging rubber 82, the outer peripheral urging rubber 88, the distal end urging rubber 112, and the like may be integrally formed with each other, or may be formed separately.

The guide mechanism for inserting the connecting parts 54a, 54b of the second attachment member 22 along the connecting grooves 72a, 72b of the bracket 14 is not limited to the aforementioned mechanism in which the connecting parts 54a, 54b on the opposite sides are slidably guided by the respective stepped convex parts 92, 102 provided in the connecting grooves 72a, 72b on the opposite sides. For example, the connecting part 54a/54b may be slidably guided by the connecting groove 72a/72b only on one of the left and right sides. Moreover, such a guide mechanism is not essential in the present disclosure. For example, it would also be acceptable that such a slide-type guide mechanism is not provided, and the connecting part is inserted into the connecting groove so as to climb over a projection or the like constituting the detent engager.

In the preceding practical embodiment, the liquid-sealed type mount main unit 12 is illustrated as the vibration-damping device main unit. However, it would also be possible to adopt, for example, a solid-type vibration-damping device main unit without a liquid chamber in which a first attachment member and a second attachment member are elastically connected by a main rubber elastic body, an active liquid-sealed type vibration-damping device main unit that obtains an active vibration damping effect by an actuator, a switchable liquid-sealed type vibration-damping device main unit that can switch vibration damping characteristics, and the like.

The specific structure of the bracket shown in the preceding practical embodiment is merely exemplary, and as long as the connecting groove is provided, the mounting structure to the vehicle body, presence or absence and the specific structure of the top plate part and the bottom plate part, and the like can be modified appropriately.

What is claimed is:

1. A vibration damping device comprising:

a vibration-damping device main unit comprising a first attachment member and a second attachment member that are vertically remote from each other and are elastically connected by a main rubber elastic body, the second attachment member comprising a pair of connecting parts comprising a first connecting part and a second connecting part on opposite sides; and a bracket comprising opposite leg parts, the opposite leg parts comprising a pair of connecting grooves comprising a first connecting groove and a second connecting groove on opposed inner faces of the opposite leg parts, the vibration-damping device main unit being attached to the bracket from a lateral side by the pair of the connecting parts being inserted into the pair of the connecting grooves, wherein the pair of the connecting parts of the second attachment member and the pair of the connecting grooves of the bracket are all made of metal, the first connecting part is structured such that the metal is exposed on an entire outer peripheral surface and an entire lower face and in metal-to-metal contact with a groove-inside bottom face and a groove-inside lower face of the first connecting groove, and an upper urging rubber is on an upper face of the first connecting part and in contact with a groove-inside upper face of the first connecting groove, the second connecting part is structured such that the metal is exposed on an entire lower face and in metal-to-metal contact with a groove-inside lower face of the second connecting groove, and an upper urging rubber is on an upper face of the second connecting part and in contact with a groove-inside upper face of the second connecting groove while an outer peripheral urging rubber is on an outer peripheral surface of the second connecting part and in contact with a groove-inside bottom face of the second connecting groove, the entire outer peripheral surface of the first connecting part of the second attachment member is pressed against the groove-inside bottom face of the first connecting groove in metal-to-metal contact by an urging force of the outer peripheral urging rubber of the second connecting part being exerted on the second attachment member toward a lateral side, and between the outer peripheral surface of the first connecting part and the first connecting groove and between an inside surface of the second connecting part and the second connecting groove, respective detent engagers prevent dislodgment of the first and second connecting parts which are held in an engaged state by the urging force of the outer peripheral urging rubber and inserted in the first and second connecting grooves.

2. The vibration damping device according to claim 1, wherein the detent engagers comprise:

a first concave-and-convex engager in which a stepped convex part on the groove-inside bottom face of the first connecting groove engages with a stepped concave part on the outer peripheral surface of the first connecting part; and a second concave-and-convex engager in which a stepped convex part on an inner wall part protruding from the groove-inside bottom face of the second connecting groove engages with a stepped concave part on the inside surface of the second connecting part.

3. The vibration damping device according to claim 1, wherein at least one of the detent engagers includes locking faces locked to each other in a direction of dislodgment of one of the first and second connecting parts inserted in a corresponding one of the first and second connecting grooves, the locking faces being in a central region obtained by dividing the second attachment member into three equal parts in a direction of attachment to the bracket.

4. The vibration damping device according to claim 1, wherein in the first connecting part, the detent engager is partially in a vertical direction of the first connecting part.

5. The vibration damping device according to claim 1, wherein a distal end urging rubber is on a distal end face of the second attachment member in a direction of attachment from the lateral side to the bracket and is in contact with the bracket in the direction of attachment.

6. The vibration damping device according to claim 1, wherein the groove-inside bottom face of at least one of the first and second connecting grooves has a guide taper at least in an opening portion on a side from which a corresponding one of the first and second connecting parts is inserted, the guide taper sloping to increase a groove depth from a far side toward an opening side in a direction of insertion of the corresponding one of the first and second connecting parts.

* * * * *